United States Patent
Zhong

(10) Patent No.: US 11,861,114 B2
(45) Date of Patent: Jan. 2, 2024

(54) ELECTRONIC EQUIPMENT, METHOD FOR CONTROLLING ELECTRONIC EQUIPMENT, AND STORAGE MEDIUM

(71) Applicant: BEIJING XIAOMI MOBILE SOFTWARE CO., LTD., Beijing (CN)

(72) Inventor: Guilin Zhong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 129 days.

(21) Appl. No.: 16/990,795

(22) Filed: Aug. 11, 2020

(65) Prior Publication Data
US 2021/0286455 A1 Sep. 16, 2021

(30) Foreign Application Priority Data

Mar. 12, 2020 (CN) .......................... 202010171645.7

(51) Int. Cl.
*G06F 3/043* (2006.01)
*G01K 3/00* (2006.01)
*G01S 15/06* (2006.01)

(52) U.S. Cl.
CPC ............. *G06F 3/043* (2013.01); *G01K 3/005* (2013.01); *G01S 15/06* (2013.01); *G06F 2203/04101* (2013.01)

(58) Field of Classification Search
CPC ...... G06F 3/043; G06F 3/0416; G06F 3/0436; G06F 2203/04106; G06F 3/016; G06F 3/0412; G06F 3/017; G06F 3/042; G06F 3/041; G06F 3/011
See application file for complete search history.

(56) References Cited

U.S. PATENT DOCUMENTS

| | | | |
|---|---|---|---|
| 9,347,207 B2* | 5/2016 | Chen | F16K 11/074 |
| 9,541,982 B2* | 1/2017 | Lipasti | G06N 3/02 |
| 10,013,048 B2* | 7/2018 | Lipasti | G06N 3/02 |
| 10,267,912 B1* | 4/2019 | Birkenes | G10K 11/341 |
| 10,528,147 B2* | 1/2020 | Tashev | G06N 3/0454 |

(Continued)

FOREIGN PATENT DOCUMENTS

| | | |
|---|---|---|
| EP | 3 289 430 A1 | 3/2018 |
| WO | WO 2016/174659 A1 | 11/2016 |

OTHER PUBLICATIONS

Extended European Search Report dated Jan. 19, 2021 in European Patent Application No. 201914702, 9 pages

*Primary Examiner* — Olga V Merkoulova
(74) *Attorney, Agent, or Firm* — Oblon, McClelland, Maier & Neustadt, L.L.P.

(57) ABSTRACT

The electronic equipment includes a display, an ultrasound emitter, an ultrasound receiver, and a processor. The ultrasound emitter can be adapted to emit a first ultrasound signal into at least a space the display faces. The ultrasound receiver can be adapted to receive a second ultrasound signal. The second ultrasound signal is an echo of the first ultrasound signal reflected by an object. The processor can be connected respectively to the ultrasound emitter and the ultrasound receiver. The processor can be adapted to acquire a floating touch signal by locating the object in three-dimensional space according to charactering information charactering the first ultrasound signal and the second ultrasound signal, and execute an instruction corresponding to the floating touch signal.

15 Claims, 8 Drawing Sheets

(56) References Cited

U.S. PATENT DOCUMENTS

| | | | |
|---|---|---|---|
| 10,572,024 B1* | 2/2020 | Saba | G01N 29/12 |
| 11,255,663 B2* | 2/2022 | Binder | G01B 11/26 |
| 2007/0211022 A1* | 9/2007 | Boillot | G06F 3/043 |
| | | | 345/156 |
| 2012/0001875 A1* | 1/2012 | Li | G06F 3/017 |
| | | | 345/177 |
| 2012/0154110 A1* | 6/2012 | Kim | G06F 3/0436 |
| | | | 345/177 |
| 2013/0197320 A1* | 8/2013 | Albert | A61B 5/14542 |
| | | | 600/300 |
| 2015/0072738 A1* | 3/2015 | Mankowski | H04M 1/72436 |
| | | | 367/87 |
| 2015/0253428 A1* | 9/2015 | Holz | G01S 17/04 |
| | | | 356/5.01 |
| 2016/0321882 A1 | 11/2016 | Mankowski | |
| 2017/0083081 A1* | 3/2017 | Lipasti | G06F 1/3215 |
| 2017/0085861 A1* | 3/2017 | Rainisto | G06F 3/017 |
| 2018/0116634 A1* | 5/2018 | Mano | A61B 8/483 |
| 2019/0154439 A1* | 5/2019 | Binder | G01B 11/26 |
| 2019/0182415 A1* | 6/2019 | Sivan | G06F 3/012 |
| 2019/0387152 A1 | 12/2019 | Sivan | |
| 2020/0195833 A1 | 6/2020 | Sivan | |

\* cited by examiner

ELECTRONIC EQUIPMENT, METHOD FOR CONTROLLING ELECTRONIC EQUIPMENT, AND STORAGE MEDIUM

CROSS-REFERENCE TO RELATED APPLICATIONS

This application is based on and claims benefit of priority to Chinese Application No. 202010171645.7 filed on Mar. 12, 2020, the entire disclosure of which is hereby incorporated by reference in its entirety.

BACKGROUND

Smart phones and TVs are being used widely. Operation of a touch screen is easy and straightforward, providing good user experience. An existing touch screen is developed based on capacitive technology, and is generally referred to as a capacitive screen.

With a control method based on a capacitive screen, a user may fail to perform a touch operation effectively, such as with a wet or sweating finger. A wet finger may not be identifiable to a touch screen, as the touch screen may become far less sensitive due to increased humidity.

SUMMARY

The subject disclosure relates to the field of electronics. Embodiments herein provide electronic equipment, a method for controlling electronic equipment, and a storage medium.

According to an aspect herein, electronic equipment includes a display, an ultrasound emitter, an ultrasound receiver, and a processor. The ultrasound emitter is adapted to emitting a first ultrasound signal into at least a space the display faces. The ultrasound receiver is adapted to receiving a second ultrasound signal. The second ultrasound signal is an echo of the first ultrasound signal reflected by an object.

The processor is connected respectively to the ultrasound emitter and the ultrasound receiver. The processor is adapted to acquiring a floating touch signal by locating the object in three-dimensional space according to charactering information charactering the first ultrasound signal and the second ultrasound signal, and executing an instruction corresponding to the floating touch signal.

According to an aspect herein, a method for controlling electronic equipment is applicable to the electronic equipment including an ultrasound emitter and an ultrasound receiver. The method can include emitting, via the ultrasound emitter, a first ultrasound signal, and receiving, via the ultrasound receiver, a second ultrasound signal, the second ultrasound signal being an echo of the first ultrasound signal reflected by an object. The method can further include acquiring a floating touch signal by locating the object in three-dimensional space according to charactering information charactering the first ultrasound signal and the second ultrasound signal, and executing an instruction corresponding to the floating touch signal.

According to an aspect herein, a non-transitory computer-readable storage medium has stored therein instructions which, when executed by a processor of electronic equipment, allow the electronic equipment to implement the method for controlling electronic equipment.

The above general description and detailed description below are but exemplary and explanatory, and do not limit the subject disclosure.

BRIEF DESCRIPTION OF THE ACCOMPANYING DRAWINGS

Drawings here are incorporated in and constitute part of the specification, illustrate exemplary embodiments according to the subject disclosure, and together with the specification, serve to explain the principle of the subject disclosure.

DETAILED DESCRIPTION

Figure 1:
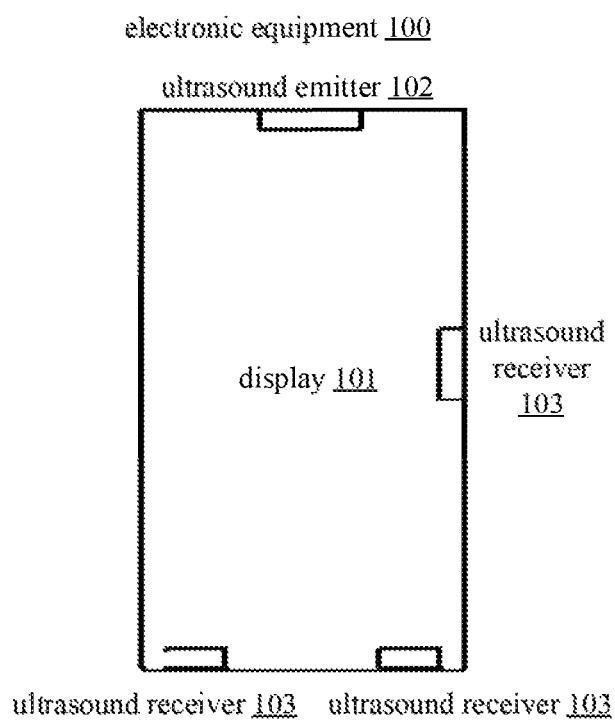
FIG. 1 is a diagram of electronic equipment according to an exemplary embodiment herein.

Exemplary embodiments, examples of which are illustrated in the accompanying drawings, are elaborated below. The following description may refer to the accompanying drawings, in which identical or similar elements in two drawings are denoted by identical reference numerals unless indicated otherwise. Implementations set forth in the following exemplary embodiments do not represent all implementations in accordance with the subject disclosure. Rather, they are mere examples of the apparatus (i.e., device) and method in accordance with certain aspects of the subject disclosure as recited in the accompanying claims. The exemplary implementation modes may take on multiple forms, and should not be taken as being limited to examples illustrated herein. Instead, by providing such implementation modes, embodiments herein may become more comprehensive and complete, and comprehensive concept of the exemplary implementation modes may be delivered to those skilled in the art. Implementations set forth in the following exemplary embodiments do not represent all implementations in accordance with the subject disclosure. Rather, they are merely examples of the apparatus and method in accordance with certain aspects herein as recited in the accompanying claims.

A term used in an embodiment herein is merely for describing the embodiment instead of limiting the subject disclosure. A singular form "a" and "the" used in an embodiment herein and the appended claims may also be intended to include a plural form, unless clearly indicated otherwise by context. Further note that a term "and/or" used herein may refer to and contain any combination or all possible combinations of one or more associated listed items.

Note that although a term such as first, second, third may be adopted in an embodiment herein to describe various kinds of information, such information should not be limited to such a term. Such a term is merely for distinguishing information of the same type. For example, without departing from the scope of the embodiments herein, the first information may also be referred to as the second information. Similarly, the second information may also be referred to as the first information. Depending on the context, a "if" as used herein may be interpreted as "when" or "while" or "in response to determining that."

In addition, described characteristics, structures or features may be combined in one or more implementation modes in any proper manner. In the following descriptions, many details are provided to allow a full understanding of embodiments herein. However, those skilled in the art will know that the technical solutions of embodiments herein may be carried out without one or more of the details, alternatively, another method, component, device, option, etc., may be adopted. Under other conditions, no detail of a known structure, method, device, implementation, material or operation may be shown or described to avoid obscuring aspects of embodiments herein.

A block diagram shown in the accompanying drawings may be a functional entity which may not necessarily correspond to a physically or logically independent entity. Such a functional entity may be implemented in form of software, in one or more hardware modules or integrated circuits, or in different networks and/or processor devices and/or microcontroller devices.

In addition, a term such as "first", "second", and the like, may serve but for description purposes and should not be construed as indication or implication of relevancy, or implication of a quantity of technical features under consideration. Accordingly, a feature with an attributive "first", "second", etc., may expressly or implicitly include at least one such feature. Herein by "multiple", it may mean two or more unless indicated otherwise expressly.

FIG. 1 is a diagram of electronic equipment 100 according to an exemplary embodiment herein. As shown in FIG. 1, the electronic equipment 100 includes a display 101, an ultrasound emitter 102, an ultrasound receiver 103, and a processor 104.

The ultrasound emitter 102 is adapted to emitting a first ultrasound signal into at least a space the display faces. The ultrasound receiver 103 is adapted to receiving a second ultrasound signal. The second ultrasound signal is an echo of the first ultrasound signal reflected by an object.

The processor 104 is connected respectively to the ultrasound emitter and the ultrasound receiver. The processor is adapted to acquiring a floating touch signal by locating the object in three-dimensional space according to characterizing information characterizing the first ultrasound signal and the second ultrasound signal, and executing an instruction corresponding to the floating touch signal.

Electronic equipment 100 may send an ultrasound signal. Electronic equipment 100 may receive an ultrasound signal. An ultrasound signal is an acoustic signal of a frequency higher than 20,000 Hz. Electronic equipment 100) may include a mobile User Equipment (UE), a fixed UE, etc., including a display. For example, electronic equipment 100 may include a mobile phone, a tablet computer, a television, and the like.

An ultrasound emitter 102 may be an existing device in electronic equipment 100, such as a speaker capable of playing an audio. An ultrasound receiver 103 may also be an existing device in electronic equipment 100, such as a microphone capable of collecting an audio. A processor 140 may include an Application Processor (AP), a microprocessor unit (MCU), etc. Of course, an ultrasound emitter 102, an ultrasound receiver 103, etc., may be provided separately in electronic equipment. Embodiments herein are not limited thereto.

A space a display 101 faces may refer to a space in a direction a display surface of a screen of the display 101 faces. An ultrasound emitter 102 may emit a first ultrasound signal into a space a display 101 faces. Then, an ultrasound receiver 103 may detect a second ultrasound signal. The second ultrasound signal may be an echo of the first ultrasound signal reflected by an object. An object may be any object within a range covered by the first ultrasound signal. For example, the object may include, but is not limited to, a finger of a user, a stylus held by a user, and the like.

A processor 104 may be connected respectively to an ultrasound emitter 102 and an ultrasound receiver 103. A processor 104 may locate an object in three-dimensional space according to characterizing information that characters a first ultrasound signal and a second ultrasound signal. Characterizing information that characters a first ultrasound signal and a second ultrasound signal may include at least a time of emitting the first ultrasound signal, a time of receiving the second ultrasound signal, etc. The characterizing information that characters the first ultrasound signal and the second ultrasound signal may further include an angle of emitting the first ultrasound signal, an angle of receiving the second ultrasound signal, and the like.

A processor 104 may locate an object in three-dimensional space according to characterizing information that characters a first ultrasound signal and a second ultrasound signal. That is, any object within a spatial range coverable by a first ultrasound signal may be located. Further, the processor 104 may acquire a floating touch signal by locating the object in three-dimensional space. The processor may execute an instruction corresponding to the floating touch signal. A floating touch signal may be acquired by locating an object in three-dimensional space as follows. A location of a projection of an object on a display may be determined according to a location of the object in three-dimensional space.

A floating touch signal corresponding to the location of the projection of the object on the display may be acquired. For example, a first correspondence between a location of a projection of an object on a display and an application may be stored in electronic equipment. The electronic equipment may determine the location of the projection of an object on the display. The electronic equipment may acquire, based on the first correspondence, a floating touch signal for opening an application corresponding to the location of the projection of the object on the display. The electronic equipment may open the application.

A floating touch signal may be acquired by locating an object in three-dimensional space as follows. A trajectory of an object may be determined according to a location of the object in three-dimensional space within a preset duration.

A floating touch signal corresponding to the trajectory may be acquired. For example, a second correspondence between a trajectory of an object and an instruction for displaying a page via a display may be stored in electronic equipment. The electronic equipment may locate the object in three-dimensional space within a predetermined period.

Then, the electronic equipment may determine a trajectory of the object. The electronic equipment may acquire, based on the second correspondence, a floating touch signal for controlling display of a page. For example, when a trajectory of the object is moving away from the bottom of a display, a floating touch signal for controlling display of a page sliding up may be acquired. When a trajectory of the object is approaching a left edge of a display gradually, a floating touch signal for controlling display of switching to a next page may be acquired.

Electronic equipment locates an object in three-dimensional space based on charactering information that characters a first ultrasound signal emitted and a second ultrasound signal. Then, the electronic equipment acquires a floating touch signal according to a location of the object in three-dimensional space, thereby implementing floating control. On one hand, this allows a user to control electronic equipment without having to touch a display of the electronic equipment. This avoids failure of a user to control the display effectively due to a wet finger as may occur with contact-based control, improving user experience. On the other hand, compared to a mode in which a gesture of a user is identified according to an ultrasound signal and then floating touch is performed, with embodiments herein, location-based control at a more fine-rained level may be implemented by floating touch based on locating an object in three-dimensional space.

The ultrasound receiver 103 and the ultrasound emitter 102 may be provided as separate pieces. There may be N ultrasound receivers 103. At least two ultrasound receivers 103 of the N ultrasound receivers may be located along different edges of the display. The N may be a positive integer no less than 3. The N ultrasound receivers 103 may be adapted to acquiring N second ultrasound signals by receiving the second ultrasound signal respectively.

The processor 104 may be adapted to locating the object in three-dimensional space according to a time of emitting the first ultrasound signal, a time of receiving each of the N second ultrasound signals, and information on locations of the N ultrasound receivers. A processor 104 may determine a difference between a time of emitting a first ultrasound signal and a time of receiving a second ultrasound signal by an ultrasound receiver 103. The processor may determine a distance between an object and the ultrasound receiver 103 according to the difference and a speed at which an ultrasound signal propagates.

For example, an ultrasound emitter 102 may emit a first ultrasound signal at a time $T_0$. An ultrasound receiver 103 of N ultrasound receivers 103 may receive a second ultrasound signal at time $T_1$. The second ultrasound signal may be an echo reflected by an object. It is known that an ultrasound travels at a speed V. Then, a distance L between the object and the ultrasound receiver 103 may be determined using a formula (1) as follows.

$$L=(T_1-T_0)*V \qquad (1)$$

A first location of an object determined by a processor 104 may refer to distances between the object and the respective N ultrasound receivers 103, as determined by the processor 104. The processor 104 may determine the location of the object in three-dimensional space by determining distances between the object and the respective N ultrasound receivers 103.

At least two ultrasound receivers 103 of the N ultrasound receivers may be located along different edges of the display 101. Accordingly, a polyhedron may be formed by connecting any two ultrasound receivers 103 of the known N ultrasound receivers 103 and connecting an object and each of the ultrasound receivers 103. A length of an edge of the polyhedron may be the distance between any two of the ultrasound receivers 103, or the distance between the object and an ultrasound receiver 103. The location of the object in three-dimensional space may be determined based on a fixed structure of the polyhedron. Accordingly, electronic equipment may acquire a floating touch signal by locating the object in three-dimensional space, implementing floating touch.

The ultrasound emitter 102 may be provided along a first edge of the display 101. At least one ultrasound receiver 103 may be provided along a second edge of the display 101. The second edge may be opposite the first edge. Alternatively, the second edge may be adjacent to the first edge.

An ultrasound emitter 102 may radiate a first ultrasound signal into a space a display 101 faces. Accordingly, the first ultrasound signal radiated may be reflected by an object, sending back multiple second ultrasound signals. Accordingly, by providing at least one ultrasound receiver 103 of multiple ultrasound receivers 103 and an ultrasound emitter 102 respectively along different edges, a second ultrasound signal may be received within a greater range. That is, the location of an object within a greater three-dimensional space may be determined. Accordingly, electronic equipment may support floating touch within a greater range.

If the second edge is opposite the first edge, the second edge may be identical to the first edge in length. If the second edge is adjacent to the first edge, the second edge may be greater than the first edge in length. A display 101 of electronic equipment may be of a rectangular shape. If the second edge is opposite the first edge, the second edge may be identical to the first edge in length. The second edge may be less than an adjacent edge in length.

A display 101 of electronic equipment may be of a rectangular shape, for example. When a second edge of the display is opposite a first edge of the display, the first edge and the second edge are short edges of the rectangle. That is, an ultrasound emitter 102 provided along the first edge may be far away from at least one ultrasound receiver 103 provided along the second edge. Accordingly, when a first ultrasound signal is radiated using the ultrasound emitter 102 and reflected by an object, a second ultrasound signal may be sent back at any angle. Compared to a case where an ultrasound receiver 103 and an ultrasound emitter 102 are provided at one location, second ultrasound signals may be received at a wider range of angles of reflection. Accordingly, electronic equipment may support floating touch within a greater range.

Figure 2:
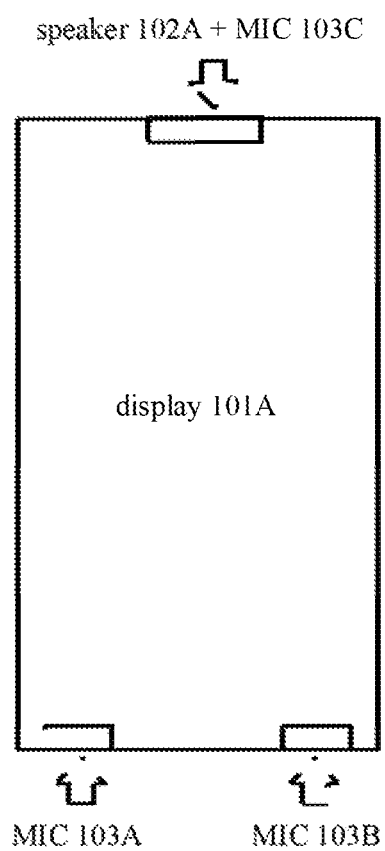
FIG. 2 is a diagram of layout of an ultrasound emitter and an ultrasound receiver applicable to a mobile phone according to an exemplary embodiment herein.

For example, FIG. 2 is a diagram of layout of an ultrasound emitter and an ultrasound receiver applicable to a mobile phone according to an exemplary embodiment herein. As shown in FIG. 2, the mobile phone may include a display 101A, a speaker 102A, a microphone 103A, a microphone 103B, and a microphone 103C. The speaker 102A may be the ultrasound emitter 102 according to one or more embodiments herein. The microphone 103A, the microphone 1038, and the microphone 103C may be the N ultrasound receivers 103 according to one or more embodiments herein. In this example, the N may be 3. Note that the N is not limited to 3. The speaker 102A and the microphone 103C may be provided along a top edge, i.e., a first edge, of the mobile phone. The microphones 103A and 103B may be provided along a bottom edge, i.e., a second edge of the mobile phone. With this layout, second ultrasound signals in a wider range may be detected.

Figure 3:
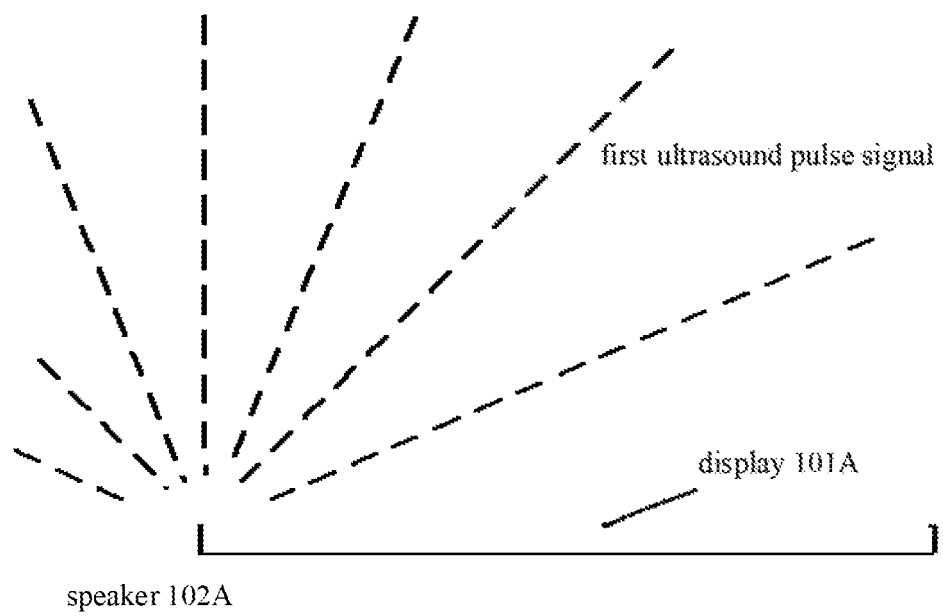
FIG. 3 is a diagram of emitting an ultrasound signal by an ultrasound emitter according to an exemplary embodiment herein.

Based on FIG. 2, FIG. 3 is a diagram of emitting an ultrasound signal by an ultrasound emitter according to an exemplary embodiment herein. FIG. 3 shows a side view of a mobile phone. A speaker 102A located at the top of the mobile phone may radiate a first ultrasound signal into a space a display 101A faces.

Figure 4A:
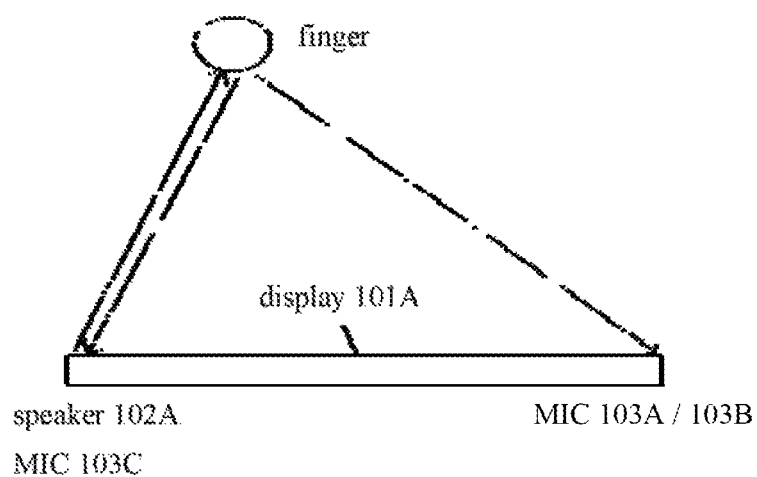
FIG. 4A is a diagram of emitting an ultrasound signal by an ultrasound emitter and receiving an ultrasound signal by an ultrasound receiver according to an exemplary embodiment herein.
Figure 4B:
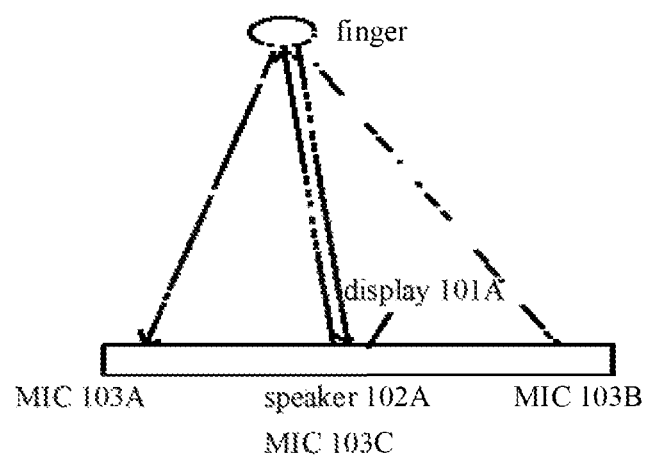
FIG. 4B is a diagram of emitting an ultrasound signal by an ultrasound emitter and receiving an ultrasound signal by an ultrasound receiver according to an exemplary embodiment herein.

Based on FIG. 2 and FIG. 3, FIG. 4A is a diagram of emitting an ultrasound signal by an ultrasound emitter and receiving an ultrasound signal by an ultrasound receiver according to an exemplary embodiment herein. FIG. 4B is a diagram of emitting an ultrasound signal by an ultrasound emitter and receiving an ultrasound signal by an ultrasound receiver according to an exemplary embodiment herein. As shown in FIG. 4A and FIG. 4B, a finger may hang above a display 101A. An echo signal of a first ultrasound signal emitted by a speaker 102A reflected by the finger may be received respectively by a microphone 103A, a microphone 103B, and a microphone 103C. The echo signal may be a second ultrasound signal. As shown in FIG. 4A and FIG. 4B, a microphone may receive a second ultrasound signal. There may be 3 second ultrasound signals.

For example, based on the layout shown in FIG. 2 and the formula (1), a processor in a mobile phone may determine a distance L1 between a finger and a microphone 103A, a distance L2 between the finger and a microphone 103B, and a distance L3 between the finger and a microphone 103C, respectively. The location of the finger in three-dimensional space may be computed based on a tetrahedron formed by L1, L2, L3 and a distance between any two of the microphones. A floating touch signal may be determined according to the location of the finger in three-dimensional space, achieving floating control.

An ultrasound emitter 102 may be adapted to periodically radiating a first ultrasound signal into a space a display 101 faces. For example, an ultrasound emitter 102 may emit first ultrasound signals at multiple angles at a first moment. The ultrasound emitter may emit first ultrasound signals at multiple angles again after an interval T. The interval T may depend on a preset distance within which electronic equipment supports floating touch. For example, the interval may increase with a maximum floating distance supporting floating touch. The greater a maximum detection distance within which electronic equipment detects floating touch, the greater the interval T may be.

By radiating a first ultrasound signal at intervals, a second ultrasound signal may be received within a greater range and with an improved reception rate. Accordingly, electronic equipment may support floating touch within a greater range. Effective floating touch may be ensured.

The ultrasound receiver 103 and the ultrasound emitter 102 may be provided as one piece. The ultrasound emitter 102 may be adapted to emitting the first ultrasound signal into the space the display 101 faces by scan at a predetermined angular step. The ultrasound receiver 103 may be adapted to receiving the second ultrasound signal at an angle of emitting the first ultrasound signal. The processor 104 may be adapted to locating the object in three-dimensional space according to the angle of emitting the first ultrasound signal, a time of emitting the first ultrasound signal, and a time of receiving the second ultrasound signal.

An ultrasound emitter 102 may emit a first ultrasound signal into a space a display faces. An ultrasound receiver 103 and the ultrasound emitter 102 may be provided as one piece, such as in the middle at the bottom of the display 101. The ultrasound receiver 103 may receive the second ultrasound signal at an angle of emitting the first ultrasound signal by the ultrasound emitter 102.

Figure 5:
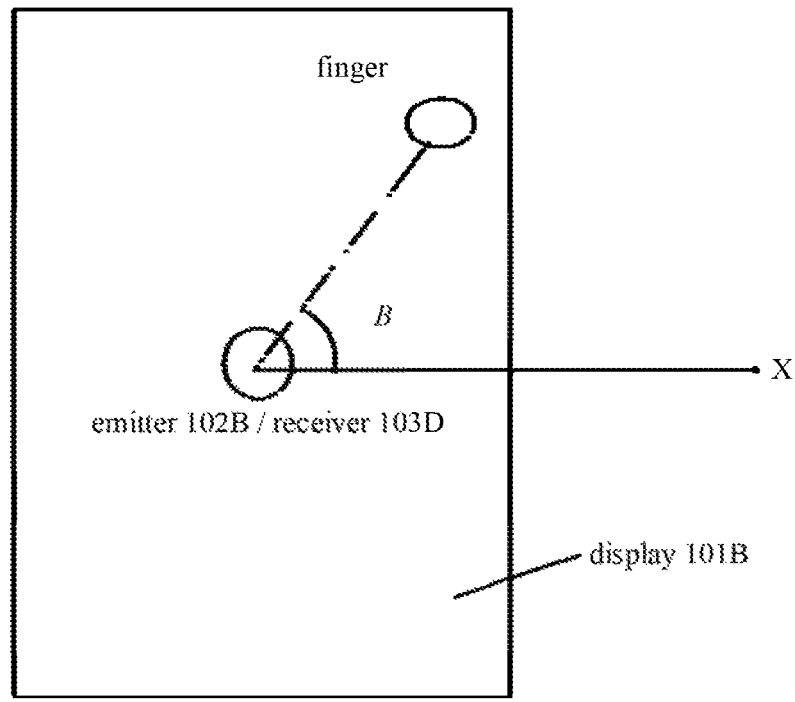
FIG. 5 is a plan view of sending an ultrasound signal and receiving an ultrasound signal in electronic equipment according to an exemplary embodiment herein.

For example, FIG. 5 is a plan view of sending an ultrasound signal and receiving an ultrasound signal in electronic equipment according to an exemplary embodiment herein. As shown in FIG. 5, an (ultrasound) emitter 102B and an (ultrasound) receiver 103D may be provided as one piece. The emitter 102B may emit a first ultrasound signal at an angle B with respect to a direction X. The receiver 103D may receive a second ultrasound signal also at the angle B. The second ultrasound signal may be an echo of the first ultrasound signal reflected by a finger. The electronic equipment may be large in size. For example, the electronic equipment may be a television.

The ultrasound emitter may be adapted to emitting the first ultrasound signal by maintaining a first angle of a first degree of freedom of the space the display face, while scan by varying a second angle of a second degree of freedom of the space the display faces. The first degree of freedom may be orthogonal to the second degree of freedom.

An ultrasound emitter 102B may emit a first ultrasound signal into a space a display 101 faces by maintaining a constant angle of a first degree of freedom. The ultrasound emitter may vary an angle of emitting the first ultrasound signal by varying a second angle of a second degree of freedom orthogonal to the first degree of freedom. By adjusting the angle of emitting the first ultrasound signal in the second degree of freedom, the first ultrasound signal may cover the entire range of the second degree of freedom. Accordingly, electronic equipment may support floating touch within a greater range of the second degree of freedom.

The first degree of freedom may refer to a dimension of latitude. The second degree of freedom may refer to a dimension of longitude. A latitude line and a longitude line are two lines on a sphere that intersect each other at a right angle at an intersection. A latitude line extends along the dimension of latitude. A longitude line extends along the dimension of longitude. An ultrasound emitter 102 may maintain a first angle of the dimension of latitude of a space a display 101 faces, and adjust a second angle of the dimension of longitude by a predetermined angular step in a range of 0 degree to 360 degrees.

For example, the ultrasound emitter 102 may maintain an angle of 5 degrees of the dimension of latitude, and adjust an angle of emitting the first ultrasound signal in the dimension of longitude by an angular step of 30 degrees, until the ultrasound emitter 102 completes emission of 360-degree scan.

The ultrasound emitter 102 may be adapted to varying the first angle of the first degree of freedom by an angular step. An ultrasound emitter 102 may vary a first angle of a first degree of freedom by an angular step. Accordingly, a first ultrasound signal may cover an entire detection space within one emission cycle. That is, the entire range of the first degree of freedom and the second degree of freedom may be covered. The detection space may be a subspace of a three-dimensional space a display 101 faces. Accordingly, electronic equipment may support floating touch within a greater range of the first degree of freedom and the second degree of freedom.

Once the first angle of the dimension of latitude has been adjusted, emission at the first angle of the dimension of latitude may be maintained. The angle of emitting the first ultrasound signal may be adjusted by varying the second angle of the dimension of longitude. Exemplarily, the angle of emission by the ultrasound emitter 102 in the dimension of latitude may be adjusted from 5 degrees to 10 degrees. The angle of emitting the first ultrasound signal may be adjusted by an angular step of 30 degrees in the dimension of longitude, until the ultrasound emitter 102 completes emission of 360-degree scan.

When an ultrasound emitter 102 emits a first ultrasound signal into a space a display 101 faces at various angles, the first ultrasound signal may be emitted directionally by serpentine scan according to rows and columns. When an ultrasound emitter 102 and an ultrasound receiver 103 are provided as one piece, the way the emitter 102 emits a first ultrasound signal is not limited to embodiments herein.

Figure 6:
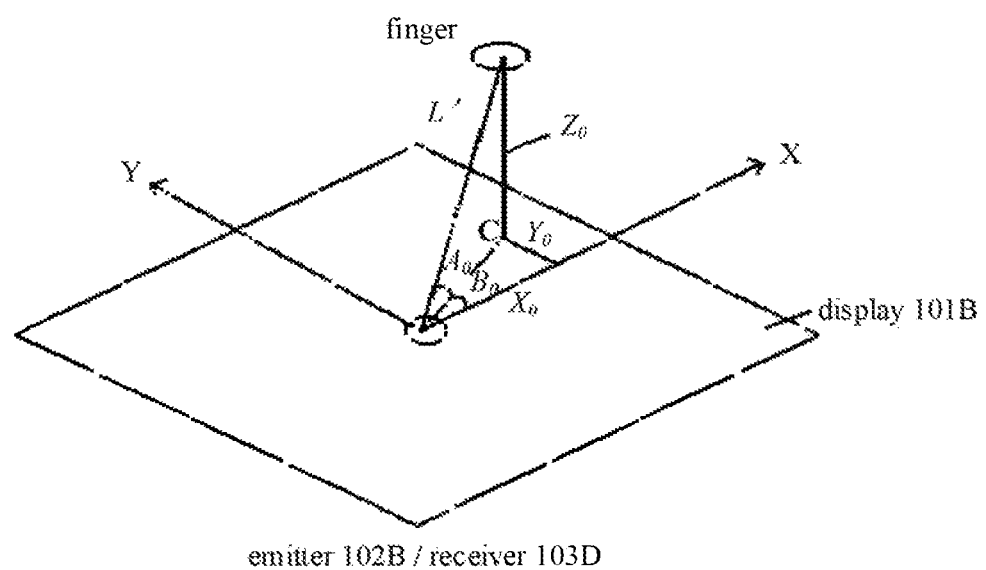
FIG. 6 is a diagram of a three-dimensional structure according to an exemplary embodiment herein, which illustrates sending an ultrasound signal and receiving an ultrasound signal as shown in FIG. 5.

An ultrasound emitter 102 may emit a first ultrasound signal into a space a display 101 faces at various angles. FIG. 6 is a diagram of a three-dimensional structure according to an exemplary embodiment herein in a spherical coordinate system, which illustrates sending an ultrasound signal and receiving an ultrasound signal as shown in FIG. 5. As shown in FIG. 6, a projection of a finger on a display 101 is at a point C. A line connecting the finger and the (ultrasound) emitter 102B may form an angle $A_0$ with the display 101. A line connecting the point C and the (ultrasound) emitter 102B or the (ultrasound) receiver 103D may form an angle $B_0$ with the axis X. The angle $A_0$ may be taken as the first angle of the dimension of latitude to be maintained. The angle $B_0$ may be taken as the second angle of the dimension of longitude to be rotated.

Based on FIG. 6, a location of an object with respect to the emitter 102B or the receiver 103D may be computed using the formula (2) as follows.

$$X_0 = L' * \cos A_0 * \cos B_0 \quad (2)$$
$$Y_0 = L' * \cos A_0 * \sin B_0$$
$$Z_0 = L' * \sin A_0$$

The L' may refer to a distance between the object and the emitter 102B or the receiver 103C, computed by the formula (1). As shown in FIG. 6, the emitter 102B or the receiver 103D may be taken as the origin. The $X_0$ may refer to a coordinate value of the projection of the object on the axis X of the display 101B. The $Y_0$ may refer to a coordinate value of the projection of the object on the axis Y of the display 101B. The $Z_0$ may refer to a height of the object with respect to the display 101B.

A location of an object in three-dimensional space may be determined based on the location of the object determined with respect to an ultrasound emitter 102 or an ultrasound receiver 103. Accordingly, floating touch may be implemented on electronic equipment. Locations of the ultrasound emitter 102 or the ultrasound receiver 103 on the display 101 are known. Accordingly, a location of the projection of an object on the display 101 may be computed, thereby implementing floating touch.

To improve accuracy of touch control, floating touch may be executed when a detected height of an object with respect to the display 101 is less than a preset distance threshold. For example, floating touch may be executed when the $Z_0$ is less than the preset distance threshold.

The electronic equipment may further include a temperature detector 105. The temperature detector 105 may be adapted to detecting an ambient temperature of the electronic equipment.

The processor 104 may be adapted to controlling the ultrasound emitter 102 to emit the first ultrasound signal in response to determining that the ambient temperature is within a preset temperature range.

A speed at which ultrasound propagates in the air tends to be affected by temperature. For example, under an excessively high temperature, an ultrasound signal may propagate at an excessively high speed. Accordingly, the distance of an object with respect to the ultrasound receiver 103 as determined using the formula (1) may turn out to be excessively large. Under an excessively low temperature, an ultrasound signal may propagate at an excessively low speed. Accordingly, the distance of an object with respect to the ultrasound receiver 103 as determined using the formula (1) may turn out to be excessively small. A distance detected under an extreme temperature may fail to reflect a true distance of an object with respect to the ultrasound receiver 103. Accordingly, with one or more embodiments herein, a temperature detector 105 may be provided in electronic equipment. The temperature detector may activate floating touch under a suitable temperature to control the ultrasound emitter 102 to emit the first ultrasound signal, improving precision in floating touch of the electronic equipment.

A display 101 of electronic equipment may serve for both display and detecting a contact-based touch operation. That is, the display 101 may also serve as a touch screen. The electronic equipment may support contact-based touch control when floating touch is deactivated. When floating touch is activated, the electronic equipment may output a reminder message to remind a user of the electronic equipment to use floating touch as well. After floating touch is activated, contact-based touch control may be disabled. Alternatively, contact-based touch control may remain activated, which is not limited.

The electronic equipment may further include a living object detector 106. The living object detector 106 may be adapted to detecting whether there is a living object within a preset distance.

The processor 104 may be adapted to, in response to determining that there is a living object within the preset distance, controlling the ultrasound emitter 102 to emit the first ultrasound signal. A first ultrasound signal may be reflected by any object. By providing a living object detector 106 in electronic equipment, an ultrasound emitter 102 may be controlled to emit the first ultrasound signal only when an object is determined as a living object, effectively reducing accidental operation unintended.

A living object detector 106 may include a camera installed in electronic equipment opposite a display 101. A processor 104 in the electronic equipment may control the camera to collect an image of a space the display 101 faces within a preset distance. If it is determined that the collected image includes a moving/varying object, such as a face with a varying expression, it may be determined that there is a living object within the preset distance. Floating touch may be activated when it is determined that there is a living object within a preset distance, to control an ultrasound emitter 102 to emit a first ultrasound signal.

Figure 7:
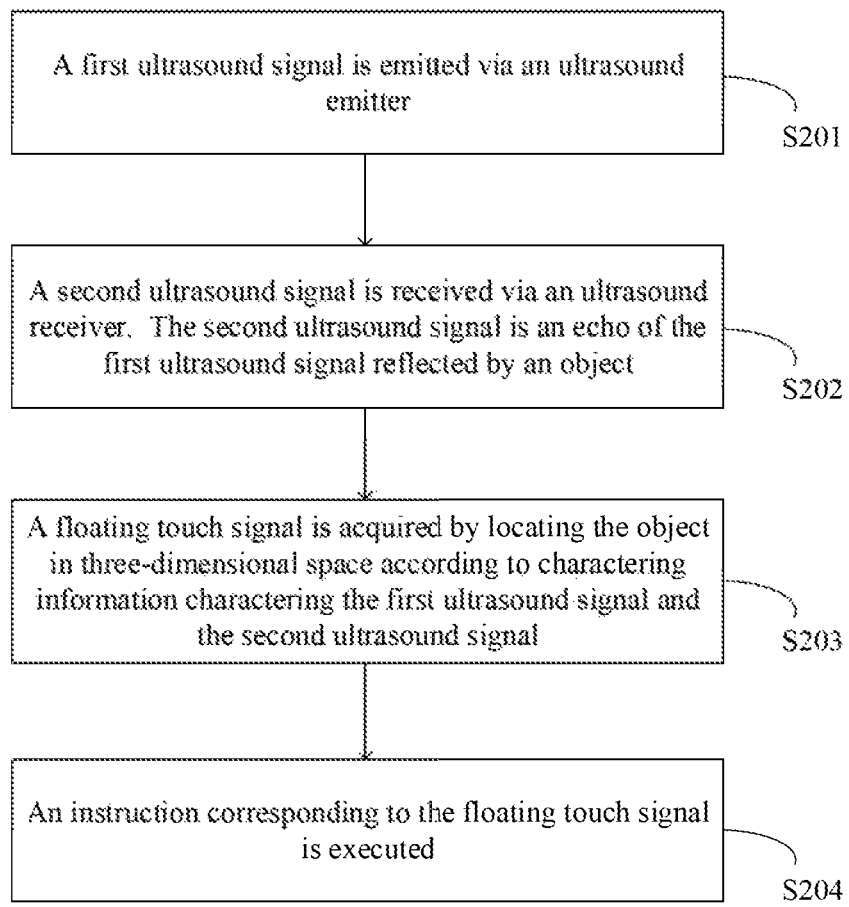
FIG. 7 is a flowchart of a method for controlling electronic equipment according to an exemplary embodiment herein.

FIG. 7 is a flowchart of a method for controlling electronic equipment according to an exemplary embodiment herein. The method is applicable to electronic equipment 100 provided herein. As shown in FIG. 7, the method may include a step as follows.

In step S201, a first ultrasound signal is emitted via an ultrasound emitter.

In step S202, a second ultrasound signal is received via an ultrasound receiver. The second ultrasound signal is an echo of the first ultrasound signal reflected by an object.

In step S203, a floating touch signal is acquired by locating the object in three-dimensional space according to charactering information charactering the first ultrasound signal and the second ultrasound signal.

In step S204, an instruction corresponding to the floating touch signal is executed.

The first ultrasound signal may be emitted as follows.

A first ultrasound signal may be emitted by scan at a predetermined angular step.

The second ultrasound signal may be received as follows. The second ultrasound signal may be received at an angle of emitting the first ultrasound signal.

The floating touch signal may be acquired by locating the object in three-dimensional space according to the charactering information charactering the first ultrasound signal and the second ultrasound signal as follows. The object may be located in three-dimensional space according to the angle of emitting the first ultrasound signal, a time of emitting the first ultrasound signal, and a time of receiving the second ultrasound signal.

The first ultrasound signal may be emitted by scan at the predetermined angular step as follows. The first ultrasound signal may be emitted by maintaining a first angle of a first degree of freedom while scan by varying a second angle of a second degree of freedom. The first degree of freedom may be orthogonal to the second degree of freedom. The first ultrasound signal may be emitted by scan at the predetermined angular step as follows. The first angle of the first degree of freedom may be varied by an angular step. There may be N ultrasound receivers. At least two ultrasound receivers of the N ultrasound receivers may be located along different edges of the electronic equipment. The N may be a positive integer no less than 3.

The second ultrasound signal may be received as follows. N second ultrasound signals as echoes of the first ultrasound signal reflected by the object may be received.

The floating touch signal may be acquired by locating the object in three-dimensional space according to the charactering information charactering the first ultrasound signal and the second ultrasound signal as follows. The floating touch signal may be acquired by locating the object in three-dimensional space according to a time of emitting the first ultrasound signal, a time of receiving each of the N second ultrasound signals, and information on locations of the N ultrasound receivers.

The first ultrasound signal may be emitted as follows. The first ultrasound signal may be radiated periodically. The method may further include a step as follows. An ambient temperature of the electronic equipment may be detected.

S201 may be as follows. The first ultrasound signal may be emitted in response to determining that the ambient temperature is within a preset temperature range. The method may further include a step as follows. It may be detected whether there is a living object within a preset distance to the electronic equipment.

S201 may be as follows. The first ultrasound signal may be emitted in response to determining that there is a living object within the preset distance. A step of the method according to at least one embodiment herein may be performed in a mode elaborated in at least one embodiment of the device herein, which will not be repeated here.

Figure 8:
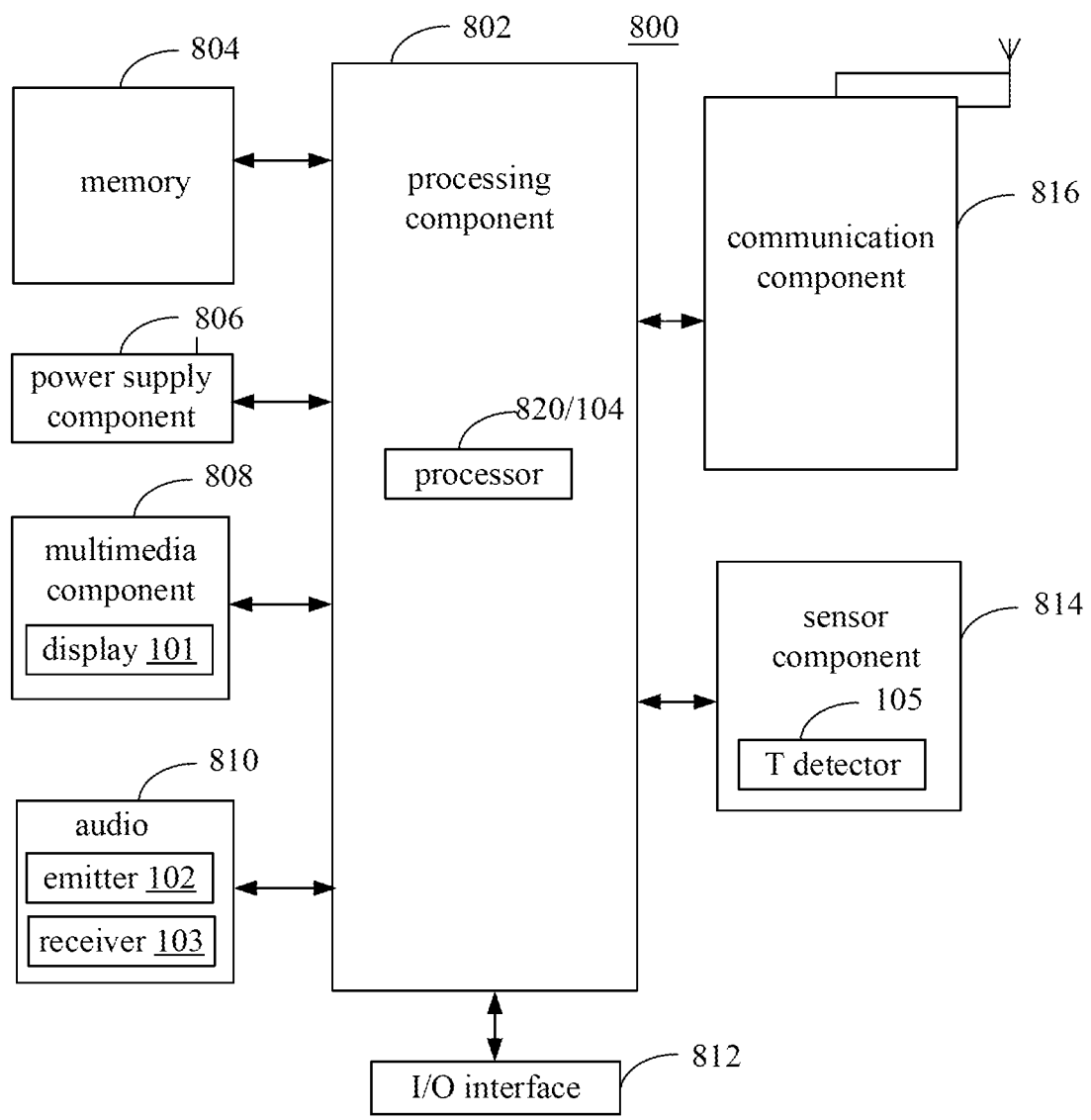
FIG. 8 is a block diagram of electronic equipment according to an exemplary embodiment.

FIG. 8 is a block diagram of electronic equipment 800 according to an exemplary embodiment. For example, the electronic equipment 800 may be a mobile phone, a computer, a TV, digital broadcast UE, messaging equipment, a gaming console, tablet equipment, medical equipment, fitness equipment, a personal digital assistant, and the like.

Referring to FIG. 8, the electronic equipment 800 may include at least one of a processing component 802, memory 804, a power supply component 806, a multimedia component 808, an audio component 810, an Input/Output (I/O) interface 812, a sensor component 814, a communication component 816, and the like.

The processing component 802 may generally control an overall operation of the electronic equipment 800, such as operations associated with display, a telephone call, data communication, a camera operation, a recording operation, and the like. The processing component 802 may include one or more processors 820 to execute instructions so as to complete all or a part of an aforementioned method. For example, the electronic equipment 800 may be the electronic equipment 100, and the processor 820 may be the processor 104. In addition, the processing component 802 may include one or more modules to facilitate interaction between the processing component 802 and other components. For example, the processing component 802 may include a multimedia portion to facilitate interaction between the multimedia component 808 and the processing component 802.

The memory 804 may be adapted to storing various types of data to support the operation at the electronic equipment 800. Examples of such data may include instructions of any application or method adapted to operating on the electronic equipment 800, contact data, phonebook data, messages, pictures, videos, etc. The memory 804 may be realized by any type of transitory or non-transitory storage equipment or a combination thereof, such as Static Random Access Memory (SRAM), Electrically Erasable Programmable Read-Only Memory (EEPROM), Erasable Programmable Read-Only Memory (EPROM), Programmable Read-Only Memory (PROM), Read-Only Memory (ROM), magnetic memory, flash memory, a magnetic disk, a compact disk, and the like.

The power supply component 806 may supply electric power to various components of the electronic equipment 800. The power supply component 806 may include a power management system, one or more power sources, and other components related to generating, managing, and distributing electricity for the electronic equipment 800.

The multimedia component 808 may include a screen that provides an output interface between the electronic equipment 800 and a user. The screen may include a Liquid Crystal Display (LCD), a Touch Panel (TP), and the like. If the screen includes a TP, the screen may be realized as a touch screen to receive a signal input by a user. The TP may include one or more touch sensors for sensing touch, slide, and gestures on the TP. The one or more touch sensors not only may sense the boundary of a touch or slide move, but also detect the duration and pressure related to the touch or slide move. The multimedia component 808 may include at least one of a front camera or a rear camera. When the electronic equipment 800 is in an operation mode such as a photographing mode or a video mode, at least one of the front camera or the rear camera may receive external multimedia data. Each of the front camera or the rear camera may be a fixed optical lens system or may have a focal length and be capable of optical zooming.

The audio component 810 may be adapted to outputting and/or inputting an audio signal. For example, the audio component 810 may include a microphone (MIC). When the electronic equipment 800 is in an operation mode, such as a call mode, a recording mode, a voice recognition mode, and the like, the MIC may be adapted to receiving an external audio signal. The received audio signal may be further stored in the memory 804 or may be sent via the communication component 816. The audio component 810 may further include a loudspeaker adapted to outputting the audio signal.

The I/O interface 812 may provide an interface between the processing component 802 and a peripheral interface portion. Such a peripheral interface portion may be a keypad, a click wheel, a button, and the like. Such a button may include but is not limited to at least one of a homepage button, a volume button, a start button, or a lock button.

The sensor component 814 may include one or more sensors for assessing various states of the electronic equipment 800. For example, the sensor component 814 may detect an on/off state of the electronic equipment 800 and relative positioning of components such as the display and the keypad of the electronic equipment 800. The sensor component 814 may further detect a change in the position of the electronic equipment 800 or of a component of the electronic equipment 800, whether there is contact between the electronic equipment 800 and a user, the orientation or acceleration/deceleration of the electronic equipment 800, a change in the temperature of the electronic equipment 800, etc. The sensor component 814 may include a proximity sensor adapted to detecting existence of a nearby object without physical contact. The sensor component 814 may further include an optical sensor such as a Complementary Metal-Oxide-Semiconductor (CMOS) or a Charge-Coupled-Device (CCD) image sensor used in an imaging application. The sensor component 814 may further include an acceleration sensor, a gyroscope sensor, a magnetic sensor, a pressure sensor, a temperature sensor, etc.

The communication component 816 may be adapted to facilitating wired or wireless communication between the electronic equipment 800 and other equipment. The electronic equipment 800 may access a wireless network based on any communication standard, such as Wi-Fi, 2G, 3G . . . , or a combination thereof. The communication component 816 may broadcast related information or receive a broadcast signal from an external broadcast management system via a broadcast channel. The communication component 816 may include a Near Field Communication (NFC) module for short-range communication. For example, the NFC module may be based on technology such as Radio Frequency Identification (RFID), Infrared Data Association (IrDA), Ultra-Wideband (UWB) technology, Bluetooth (BT), etc.

In an exemplary embodiment, the electronic equipment 800 may be realized by one or more electronic components such as an Application Specific Integrated Circuit (ASIC), a Digital Signal Processor (DSP), a Digital Signal Processing Device (DSPD), a Programmable Logic Device (PLD), a Field Programmable Gate Array (FPGA), a controller, a microcontroller, a microprocessor, and the like, to implement the method.

In an exemplary embodiment, a non-transitory computer-readable storage medium including instructions, such as memory 804 including instructions, may be provided. The instructions may be executed by the processor 820 of the electronic equipment 800 to implement an aforementioned method. For example, the non-transitory computer-readable storage medium may be Read-Only Memory (ROM), Random Access Memory (RAM), Compact Disc Read-Only Memory (CD-ROM), a magnetic tape, a floppy disk, optical data storage equipment, and the like.

A non-transitory computer-readable storage medium has stored therein instructions which, when executed by a processor of electronic equipment, allow the electronic equipment to implement a method for controlling electronic equipment. The electronic equipment includes a display, an ultrasound emitter, an ultrasound receiver, and a processor.

The ultrasound emitter is adapted to emitting a first ultrasound signal into at least a space the display faces. The ultrasound receiver is adapted to receiving a second ultrasound signal. The second ultrasound signal is an echo of the first ultrasound signal reflected by an object.

The processor is connected respectively to the ultrasound emitter and the ultrasound receiver. The processor is adapted to acquiring a floating touch signal by locating the object in three-dimensional space according to charactering information charactering the first ultrasound signal and the second ultrasound signal, and executing an instruction corresponding to the floating touch signal.

Other implementations of the subject disclosure will be apparent to a person having ordinary skill in the art that has considered the specification and or practiced the subject disclosure. The subject disclosure is intended to cover any variation, use, or adaptation of the subject disclosure following the general principles of the subject disclosure and including such departures from the subject disclosure as come within common knowledge or customary practice in the art. The specification and the embodiments are intended to be exemplary only, with a true scope and spirit of the subject disclosure being indicated by the appended claims.

It should be understood that the subject disclosure is not limited to the exact construction that has been described above and illustrated in the accompanying drawings, and that various modifications and changes can be made to the subject disclosure without departing from the scope of the subject disclosure. It is intended that the scope of the subject disclosure is limited only by the appended claims.

What is claimed is:

1. Electronic equipment having a display, the electronic equipment comprising:
    an ultrasound emitter adapted to emit a first ultrasound signal into at least a space that the display faces, and repeat the emission at an interval that depends on a preset distance within which the electronic equipment supports floating touch, wherein the greater the preset distance, the greater the interval is;
    an ultrasound receiver adapted to receive a second ultrasound signal that is an echo of the first ultrasound signal reflected by an object;
    a processor that is coupled to the ultrasound emitter and the ultrasound receiver, the processor being adapted to acquire a floating touch signal by locating the object in three-dimensional space according to charactering information charactering the first ultrasound signal and the second ultrasound signal, and execute an instruction corresponding to the floating touch signal; and
    a temperature detector adapted to detect an ambient temperature of the electronic equipment,
    wherein the processor is adapted to activate floating touch to control the ultrasound emitter to emit the first ultrasound signal in response to the ambient temperature being within a preset temperature range.

2. The electronic equipment of claim 1, wherein:
    the ultrasound receiver and the ultrasound emitter are provided as one piece,
    the ultrasound emitter is adapted to emit the first ultrasound signal into the space the display faces by scan at a predetermined angular step,
    the ultrasound receiver is adapted to receive the second ultrasound signal at an angle of emitting the first ultrasound signal, and the processor is adapted to locate the object in three-dimensional space based on the angle of emitting the first ultrasound signal, a time of emitting the first ultrasound signal, and a time of receiving the second ultrasound signal.

3. The electronic equipment of claim 2, wherein:
the ultrasound emitter is adapted to emit the first ultrasound signal by maintaining a first angle of a first degree of freedom of the space the display faces, while scanning by varying a second angle of a second degree of freedom of the space the display faces, where the first degree of freedom is orthogonal to the second degree of freedom.

4. The electronic equipment of claim 3,
wherein the ultrasound emitter is adapted to vary the first angle of the first degree of freedom by an angular step.

5. The electronic equipment of claim 1, wherein:
the ultrasound emitter and the ultrasound receiver are provided as separate pieces,
there are N ultrasound receivers and at least two ultrasound receivers of the N ultrasound receivers are located along different edges of the display, where N is a positive integer no less than 3,
the N ultrasound receivers are adapted to acquire N second ultrasound signals by receiving the second ultrasound signal respectively, and
the processor is adapted to locate the object in three-dimensional space based on a time of emitting the first ultrasound signal, a time of receiving each of the N second ultrasound signals, and information on locations of the N ultrasound receivers.

6. The electronic equipment of claim 5, wherein
the ultrasound emitter is provided along a first edge of the display, and
at least one of the N ultrasound receivers is provided along a second edge of the display, where the second edge is opposite the first edge or the second edge is adjacent to the first edge.

7. The electronic equipment of claim 6, wherein, in response to the second edge being:
opposite the first edge, the second edge is identical to the first edge in length, and
adjacent to the first edge, the second edge is greater than the first edge in length.

8. The electronic equipment of claim 1, further comprising a living object detector adapted to detect whether there is a living object within the preset distance,
wherein the processor is adapted to control the ultrasound emitter to emit the first ultrasound signal in response to determining that there is a living object within the preset distance.

9. A method for controlling electronic equipment, the method being applicable to the electronic equipment, the method comprising:
detecting, via a temperature detector, an ambient temperature of the electronic equipment;
activating floating touch and emitting, via an ultrasound emitter, a first ultrasound signal in response to the ambient temperature being within a preset temperature range, and repeating the emission at an interval that depends on a preset distance within which the electronic equipment supports floating touch, wherein the greater the preset distance, the greater the interval is;
receiving, via an ultrasound receiver, a second ultrasound signal, the second ultrasound signal being an echo of the first ultrasound signal reflected by an object;
acquiring a floating touch signal by locating the object in three-dimensional space according to characterizing information characterizing the first ultrasound signal and the second ultrasound signal; and
executing an instruction corresponding to the floating touch signal.

10. The method of claim 9, wherein:
emitting the first ultrasound signal comprises emitting the first ultrasound signal by scan at a predetermined angular step,
receiving the second ultrasound signal comprises receiving the second ultrasound signal at an angle of emitting the first ultrasound signal, and
acquiring the floating touch signal comprises locating the object in three-dimensional space based on the angle of emitting the first ultrasound signal, a time of emitting the first ultrasound signal, and a time of receiving the second ultrasound signal.

11. The method of claim 10, wherein emitting the first ultrasound signal by scan at the predetermined angular step further comprises:
emitting the first ultrasound signal by maintaining a first angle of a first degree of freedom while scan by varying a second angle of a second degree of freedom, where the first degree of freedom is orthogonal to the second degree of freedom.

12. The method of claim 11, wherein emitting the first ultrasound signal by scan at the predetermined angular step further comprises
varying the first angle of the first degree of freedom by an angular step.

13. The method of claim 9, wherein:
there are N ultrasound receivers and at least two ultrasound receivers of the N ultrasound receivers are located along different edges of the electronic equipment, where N is a positive integer no less than 3,
receiving the second ultrasound signal further comprises receiving N second ultrasound signals as echoes of the first ultrasound signal reflected by the object, and
the characterizing information characterizing the first ultrasound signal and the second ultrasound signal further comprises a time of emitting the first ultrasound signal, a time of receiving each of the N second ultrasound signals, and information on locations of the N ultrasound receivers.

14. The method of claim 9, further comprising:
detecting whether there is a living object within the preset distance to the electronic equipment,
wherein emitting the first ultrasound signal comprises emitting the first ultrasound signal in response to there being a living object within the preset distance.

15. A non-transitory computer-readable storage medium having stored therein instructions which, when executed by a processor of electronic equipment, causes the electronic equipment to implement a method for controlling electronic equipment, the method comprising:
detecting, via a temperature detector, an ambient temperature of the electronic equipment;
activating floating touch and emitting, via an ultrasound emitter, a first ultrasound signal in response to the ambient temperature being within a preset temperature range, and repeating the emission at an interval that depends on a preset distance within which the electronic equipment supports floating touch, wherein the greater the preset distance, the greater the interval is;

receiving, via a ultrasound receiver, a second ultrasound signal that is an echo of the first ultrasound signal reflected by an object;

acquiring a floating touch signal by locating the object in three-dimensional space according to charactering information charactering the first ultrasound signal and the second ultrasound signal; and executing an instruction corresponding to the floating touch signal.

* * * * *